United States Patent
Srebnik et al.

(10) Patent No.: US 9,122,954 B2
(45) Date of Patent: Sep. 1, 2015

(54) PERFORMING A HISTOGRAM USING AN ARRAY OF ADDRESSABLE REGISTERS

(71) Applicant: Mobileye Technologies Limited, Nicosia (CY)

(72) Inventors: Daniel Srebnik, Jerusalem (IL); Gil Dogon, Jerusalem (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 52 days.

(21) Appl. No.: 14/043,030

(22) Filed: Oct. 1, 2013

(65) Prior Publication Data

US 2015/0093028 A1    Apr. 2, 2015

(51) Int. Cl.
*G06K 9/00*    (2006.01)
*G06K 9/46*    (2006.01)
*G06T 1/20*    (2006.01)

(52) U.S. Cl.
CPC ............ *G06K 9/4647* (2013.01); *G06K 9/4633* (2013.01); *G06T 1/20* (2013.01)

(58) Field of Classification Search
CPC ..... G06T 3/0093; G06T 7/00; G06T 2200/28; G06T 2207/20016; G06K 9/00536; G06K 9/0063; G06K 9/00711; G06K 9/00791; G06K 9/00986; G06K 9/3241; G06K 9/4671; G06K 9/50; G06K 9/6201; G06K 9/6202; G06K 9/6211; G06K 9/64; G06F 9/3004; G06F 9/30032; G06F 9/30036; G06F 9/30098; G06F 9/345; G06F 9/355; G06F 9/38; G06F 9/3824; G06F 9/3885; G06F 12/0802; G06F 12/0811; G06F 12/0897; G06F 15/80; G06F 15/8023; G06F 15/8092; G06F 17/30; G06F 17/30247; G06F 17/3025; G06F 17/30256; G06F 17/30259; G06F 17/30952; G06F 17/30781; H04N 5/3675; H04N 9/8047; H04N 21/44008; H04N 21/8352; H04N 21/8355; H04N 21/8356; H04N 2201/3274
See application file for complete search history.

(56) References Cited

U.S. PATENT DOCUMENTS

| | | | |
|---|---|---|---|
| 5,083,267 A | 1/1992 | Rau et al. | |
| 5,204,944 A | 4/1993 | Wolberg | |
| 6,446,198 B1 | 9/2002 | Sazegari | |
| 6,584,223 B1 * | 6/2003 | Shiiyama | 382/173 |
| 8,139,021 B2 * | 3/2012 | Botzas et al. | 345/102 |

(Continued)

FOREIGN PATENT DOCUMENTS

WO    WO 91/02319    2/1991

OTHER PUBLICATIONS

Fast Sort on CPUs, GPUs and Intel MIC Architectures, Technical Report, Intel labs, Nadathur Satish et al., 2010.

(Continued)

*Primary Examiner* — Jose Couso
(74) *Attorney, Agent, or Firm* — The Law Office of Michael E. Kondoudis

(57) ABSTRACT

Parallel processing of an image using an array of addressable registers. Image features are extracted from the image. The image features are storable as data. According to respective values of a sorting key derived from a parameter of the data, the image features are sorted into N buckets. Using an array of M addressable registers, where M is less than N, the data are summed within the buckets to perform a histogram of the image features, according to values of a histogram key derived from said a parameter of the data.

10 Claims, 6 Drawing Sheets

(56) References Cited

U.S. PATENT DOCUMENTS

| | | | |
|---|---|---|---|
| 8,300,058 | B2 | 10/2012 | Navon et al. |
| 8,817,104 | B2* | 8/2014 | Kakita et al. ............... 348/161 |
| 2002/0053015 | A1 | 5/2002 | Tan et al. |
| 2009/0174773 | A1* | 7/2009 | Gowdy et al. ............... 348/148 |

OTHER PUBLICATIONS

Radix Sort for Vector Multiprocessors, Marco Zagha et al., Proceedings Supercomputing, 1991 pp. 712-721, Nov. 1991.

Vol. 31 No. 10 Mar. 1989 IBM Technical Disclosure Bulletin, "Pipelined Processor Without Wait State", pp. 138-140.

Shin Y-C et al.: "Special Purpose Register Array for Real-Time Image Processing" Fourth Annual IEEE International ASIC Conference and Exhibit, Sep. 23, 1991, Sep. 27, 1991, pp. P18-1.1-P18-1.4.

3-D Transformations of Images in Scanline Order, Ed Catmull, SIGGRAPH '80 Conference Proceedings Jul. 14-18, 1980 Seattle, WA, edited by James J. Thomas pp. 279-285.

Separable Image Warping With Spatial Lookup Tables, George Wolberg, Computer Graphics, vol. 23, No. 3, Jul. 1989.

"Local Image Reconstruction and Sub-Pixel Restoration Algorithms.", T.E. Boult et al., Computer graphics and image processing: Graphical models and Image processing (CVGIP:GMIP), vol. 55, No. 1. pp. 63-77, Jan. 1993.

\* cited by examiner

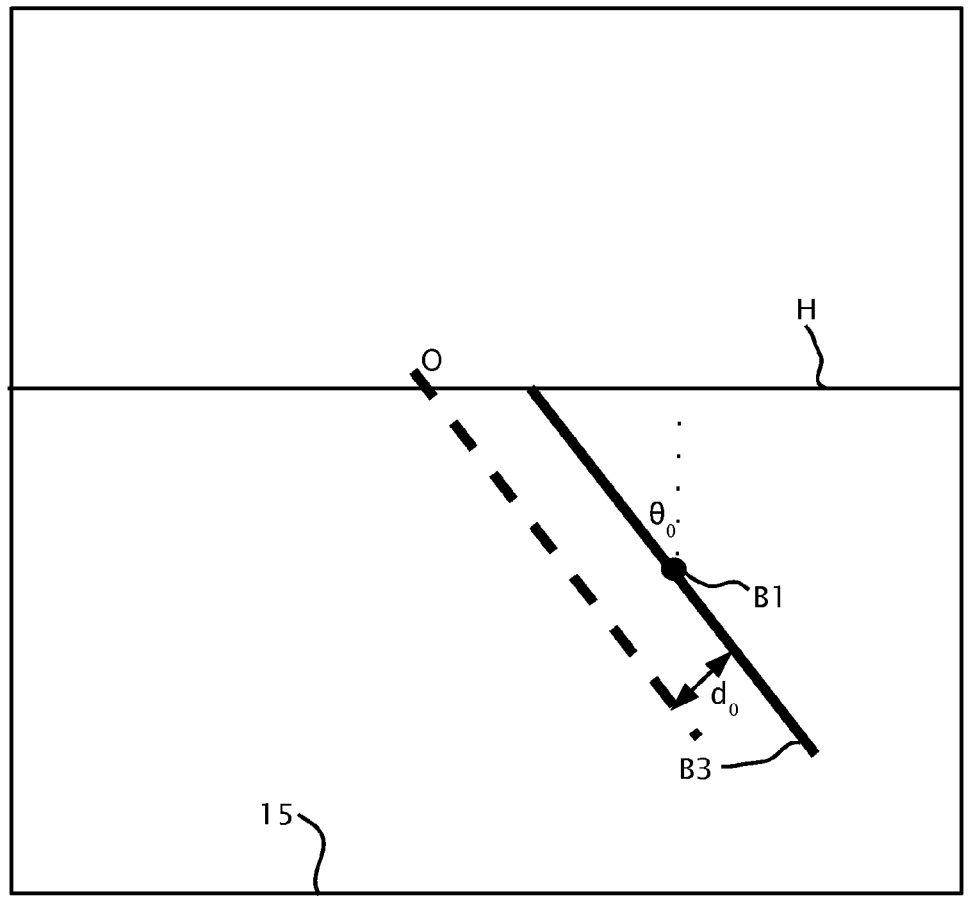
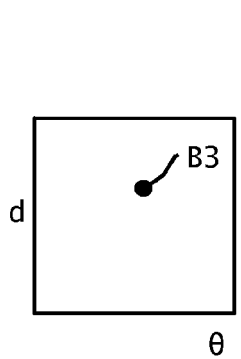
Fig. 6a
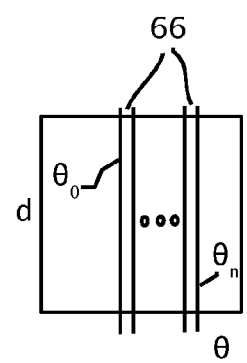
Fig. 6b
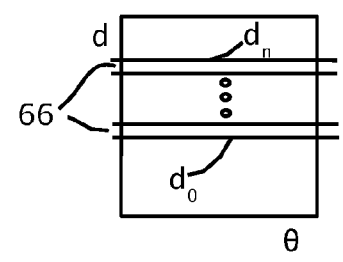
Fig. 6c
Fig. 6

PERFORMING A HISTOGRAM USING AN ARRAY OF ADDRESSABLE REGISTERS

BACKGROUND

1. Technical Field

The present disclosure relates to a method for performing a histogram using an array of addressable registers.

2. Description of Related Art

Radix-based sorting algorithms sort according to integer representations or keys which are multidigit numbers in which each digit is an integer with a value in the range $<0\ldots(m-1)>$ where m is the radix. A 32-bit integer, for example, could be treated as a 4 digit number with radix $2^{32/4}=2^8=256$. The radix m is usually chosen to minimize the running time and is highly dependent on the implementation and the number of keys being sorted. Most digital computers internally represent all of their data as electronic representations of binary numbers, so processing the digits of integer representations by groups of binary digit representations is most convenient. Two classifications of radix sorts include least significant digit (LSD) radix sorts and most significant digit (MSD) radix sorts. LSD radix sorts process the integer representations starting from the least significant digit and move towards the most significant digit. MSD radix sorts process the integer representations starting from the most significant digit and moves towards the least significant digit.

The Sobel operator, as may be used in image processing for edge detection, calculates the gradient of the image intensity, e.g. grayscale or color at each point, and provides the direction of the largest change in intensity and the rate of change in that direction. The intensity gradient indicates how "abruptly" or "smoothly" the image intensity changes at a point of the image, and how likely it is that the point of the image represents an edge. At each point in the image, the result of the Sobel operator may include either the gradient, or the normal of the gradient. The Sobel operator is based on convolving the image with a small integer valued filter in horizontal and vertical direction.

The Hough Transform is well known in the area of computer vision for use in a method for detecting contours or shapes in images. Using this method, a Hough transform image is created from a source image. An intensity gradient, at every point in the source image may be determined in different ways, one example being use of the Sobel operator. The Hough transform image is defined such that every point in the Hough transform image represents a line or curve in the source image. The intensity of a spot in the Hough transform image is determined by the number of points of an edge on the line in the source image along with the position and intensity gradient of the edge. The intensity of the spot in Hough transform space represents the significance or weight of the line in the source image and is determined by performing a histogram, summing the weights over distances and/or angles in the source image.

In general, calculation of a histogram, e.g. the Hough Transform algorithm when implemented in a computer system generally requires a large number of random access read and write operations over a large address space. Histogram algorithms are expensive in terms of execution time due to the number of cache misses of random access operations.

Thus there is a need for and it would be advantageous to have a more efficient system and method for accelerating histogram calculations, for instance the Hough Transform algorithm for detection of shapes and contours in images.

BRIEF SUMMARY

Various methods are disclosed herein for parallel processing of an image using an array of addressable registers. Multiple image features are extracted from the image. The image features are storable as data. According to respective values of a sorting key derived from a parameter of the data, the image features are sorted into N buckets. Using an array of M addressable registers, where M is less than N, the data are summed within the buckets to perform a histogram of the image features, according to values of a histogram key derived from said a parameter of the data. When the respective data of the image features are storable in binary storage in data words of I bits, the image features are sorted into $N=2^J$ buckets, where J is an integer greater than one and less than I. Using the array of at least $M=2^K$ addressable registers, where K is an integer greater or equal to the difference I–J between integer I and integer J, the data are summed respectively within the buckets to perform the histogram of the image features. The addressable registers may be configured to manipulate data stored in a read-modify-write sequence. The bucket sort may include sorting by radix and the radix over which to sort may be preliminarily determined by performing a histogram of the data over the radix to determine the resolution of the sorting key.

The image features may be: a color coordinate, at least one of a direction and magnitude of a gradient of a color coordinate, a grayscale value, at least one of a direction and/or magnitude of a gradient of a grayscale value.

For detecting contours in the image, the extraction of image features may include extraction of edge features from multiple picture elements of the image. The edge feature may include a horizontal position coordinate with respect to an origin in the image, a vertical position coordinate with respect to the origin, intensity, horizontal intensity gradient and/or vertical intensity gradient. A distance and direction angle are computed for the edge features and/or the picture elements. The picture elements and/or the edge features are sorted into multiple buckets according to respective values of a sorting key. Using the array of addressable registers, data of the picture elements and/or the edge features are summed within the buckets, according to values of a histogram key. The sorting key and histogram key are derived from a parameter including the distance and the direction angle or functions thereof.

The sorting key may include the direction angle and may be used for sorting according to direction angle into the buckets. The histogram key may include the distance used for summing data associated with like distances within the buckets. Alternatively, the sorting key may include the distance used for sorting by distance into the buckets. The histogram key may include the direction angle used for summing data associated with like direction angles within the buckets.

Various processors including an array of addressable registers is provided for herein configured to perform any of the processing methods herein disclosed.

The foregoing and/or other aspects will become apparent from the following detailed description when considered in conjunction with the accompanying drawing figures.

BRIEF DESCRIPTION OF THE DRAWINGS

The invention is herein described, by way of example only, with reference to the accompanying drawings, wherein:

FIG. 6 shows parametrization of a source image, according to a feature of the present invention.

FIG. 6a shows graphically an example of Hough transform image of the line shown in FIG. 6.

FIGS. 6b and 6c which show multiple buckets in Hough transform space, according to a feature of the present invention.

DETAILED DESCRIPTION

Figure 1:
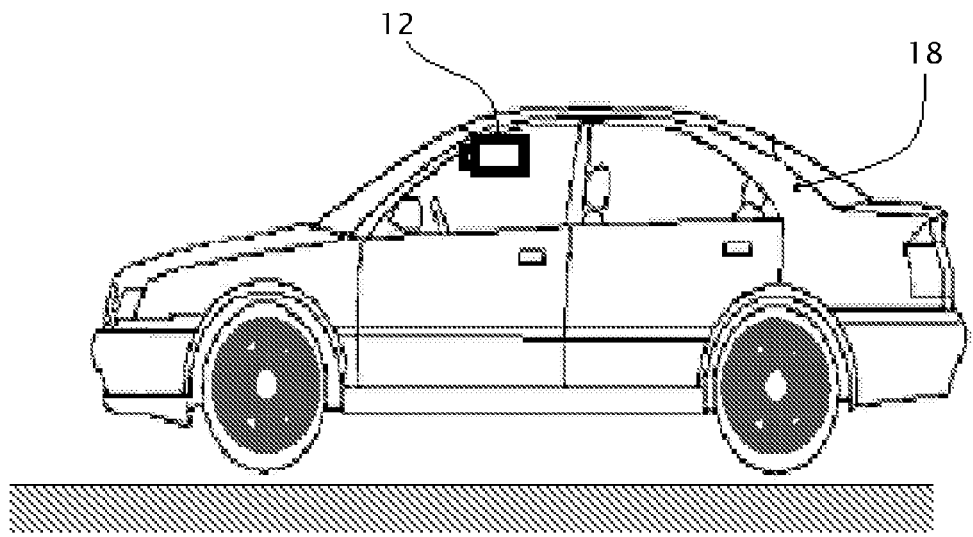
FIGS. 1 and 2 which illustrate a system including a camera or image sensor mounted in a vehicle, according to an aspect of the present invention.

Reference will now be made in detail to embodiments of the present invention, examples of which are illustrated in the accompanying drawings, wherein like reference numerals refer to the like elements throughout. The embodiments are described below to explain the present invention by referring to the figures.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 2:
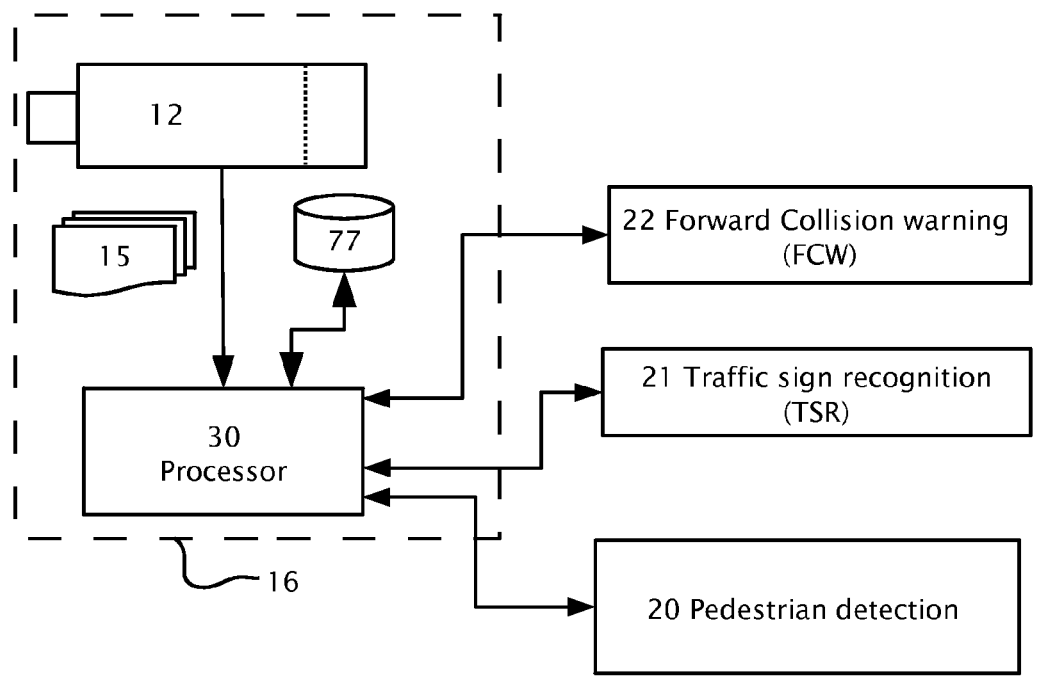

Reference is now made to FIGS. 1 and 2 which illustrate a system 16 including a camera or image sensor 12 mounted in a vehicle 18, according to an aspect of the present invention. Image sensor 12, images a field of view in the forward direction and provides image frames 15 in real time. Image frames 15 are captured by an image processor 30. Processor 30 may be used to process image frames 15 simultaneously and/or in parallel to serve a number of driver assistance systems/applications. The driver assistance systems may be implemented using specific hardware circuitry with on board software and/or software control algorithms in memory 77. Image sensor 12 may be monochrome or black-white, i.e. without color separation or image sensor 12 may be color sensitive. By way of example in FIG. 2, image frames 15 are used to serve pedestrian detection 20, traffic sign recognition (TSR) 21 and forward collision warning (FCW) 22. Processor 30 may be used to process image frames 15 to detect and recognize an image or portions of the image in the forward field of view of camera 12.

Although embodiments of the present invention find utility in the context of driver assistance applications, embodiments of the present invention may be equally applicable in general to image processing of images and specifically to other real time signal processing applications such as machine vision for example.

By way of introduction, embodiments of the present invention may be directed to efficient implementation of a large histogram calculation using for example appropriate hardware known as "Enhanced Look-up Table" as described in U.S. Pat. No. 8,300,058.

The Enhanced look-up table hardware disclosed in U.S. Pat. No. 8,300,058 may provide for parallel processing and thereby considerable time savings in histogram calculations, e.g. detection of contours using a Hough transform according to embodiments of the present invention.

Figure 3:
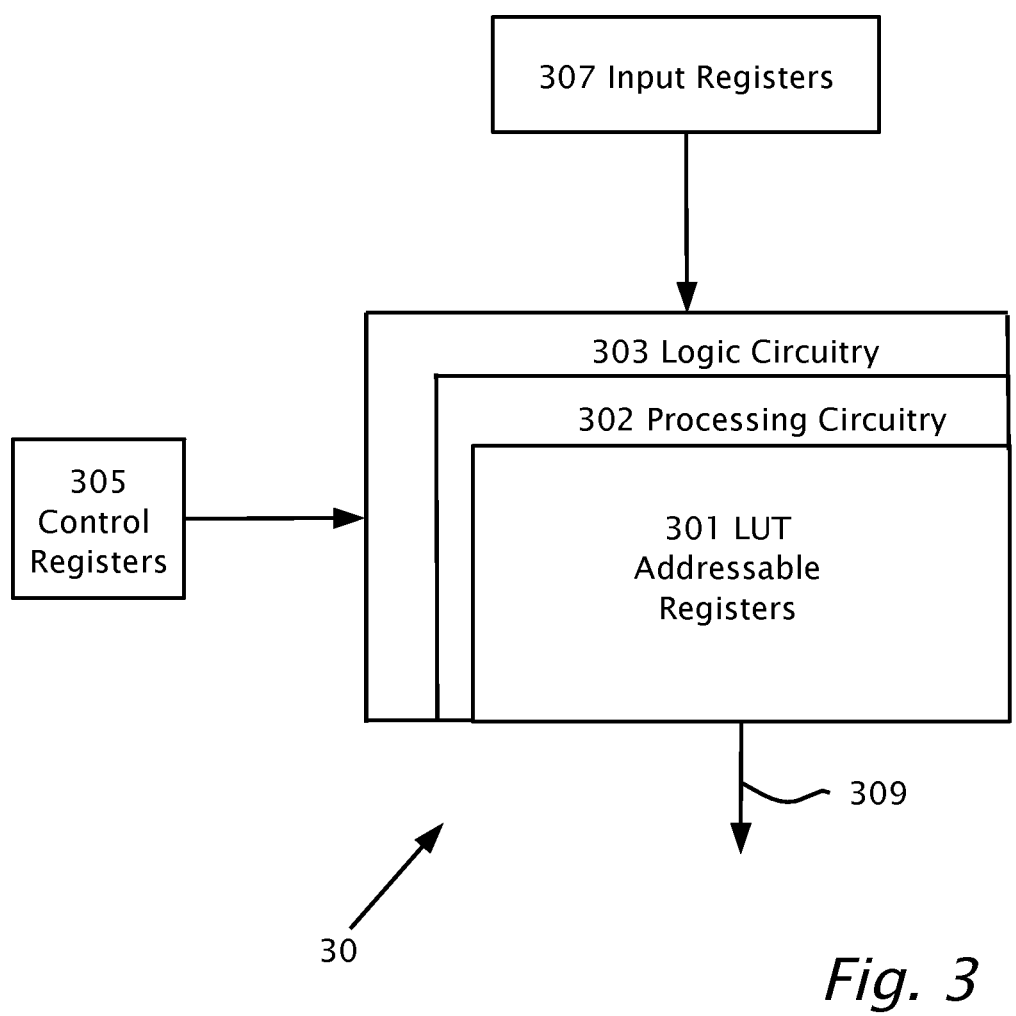
FIG. 3 illustrates a simplified diagram of a processor which includes the Enhanced look-up table hardware disclosed in U.S. Pat. No. 8,300,058.

Referring now to FIG. 3 which illustrates a simplified diagram of processor 30 which includes the enhanced look-up table hardware disclosed in U.S. Pat. No. 8,300,058. At the core of the enhanced look-up table hardware is an array 301 of addressable registers or look-up table (LUT) 301 and associated processing circuitry 302 which processes commands accessing array 301. Multiple input registers 307 are connected to array of addressable registers 301. Input registers 301 are configured to store an input command parameter and multiple operands. The operands may include multiple address operands referencing one or more of addressable registers 301. Processing circuitry 302 is configured to process data based on the input command parameter. A single instance of a command may access the addressable registers, and based on the input command parameter the processing circuitry for all of the address operands: reads the data previously stored in the addressable registers, updates or modifies the data and writes the updated data into the addressable registers. Logic circuitry 303 is attached between the input registers and processing circuitry 302. Logic circuitry 303 is configured to provide a logical output signal to processing circuitry 302 to indicate which if any of the address operands are identical to support multiple address operands being identical.

An exemplary LUT 301 may be a 256 byte register array accessible in odd and even banks. This configuration allows for four odd/even pairs of bytes to be written simultaneously and for eight separate locations to be read simultaneously. Command input parameters may be input from control registers 305 and/or operands may be input from input registers 307 for pre-processing by logic circuitry 303. Input registers 307 and output 309 are preferably latched so that until new values are latched into registers 307 or out of output 309, the previously stored values are maintained.

Figure 4:
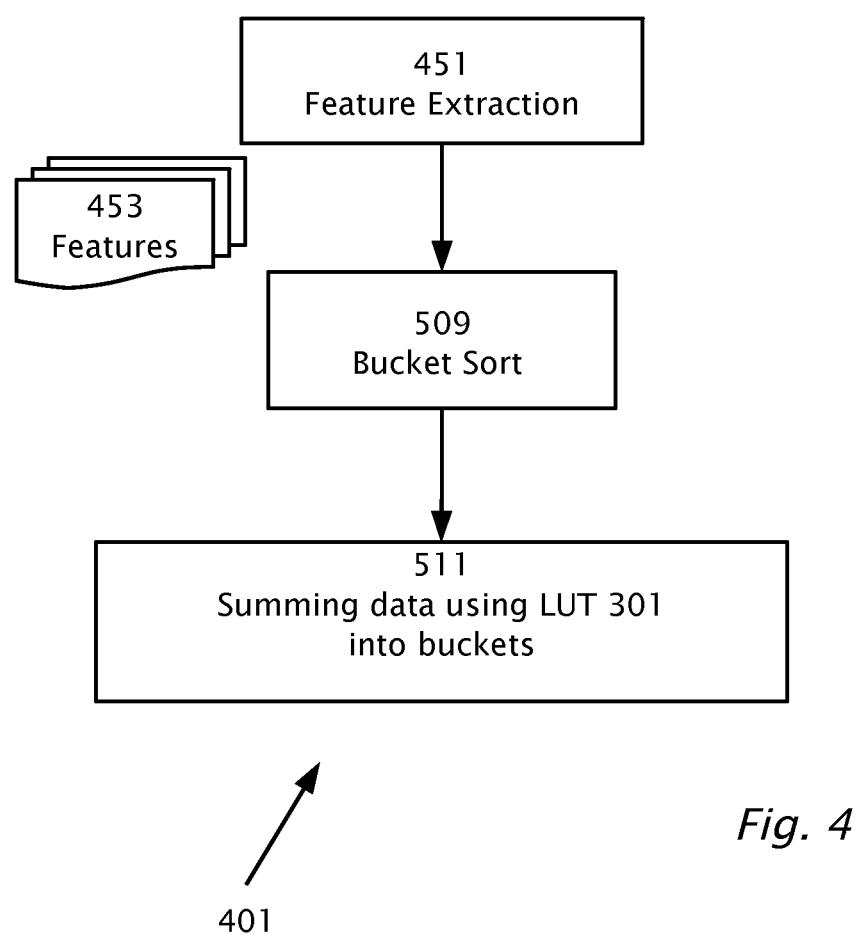
FIG. 4 shows a simplified schematic method for detecting contours of an image in image frames using parallel processing in array of addressable registers, according to an aspect of the present invention.

Reference is now made to FIG. 4, which shows a simplified schematic method 401 for calculating a histogram. In one example, a histogram may use gray scale and/or one or more color coordinates as a sorting key, using parallel processing in array of addressable registers 301, according to an aspect of the present invention. In this example, features 453 extracted (step 451) relate to the grayscale and or color coordinates in the source image in an image frame 15. In a second example, contours of an image may be detected using a Hough transform from a source image in image frames 15. Edge features 453 may be extracted (step 451) from the images in image frames 15 using the Sobel operator, for example, by outputting positions, directions (or gradients) and intensity of edge features 453 in the source image.

Bucket sort (step 509) may be similar to a radix sort. An example of a radix sort algorithm executed using parallel processing in vector processors is found in the following reference: (Radix Sort For Vector Multiprocessors, Marco Zagha and Guy E. Blelloch Supercomputing, 1991. Proceedings of the 1991 ACM/IEEE Conference on Date 18-22 Nov. 1991). The most significant bit may first be used as a sorting key and the data may be sorted into the buckets accordingly. Subsequently, other bits may used in sequence of their significance until the least significant bit is reached. The operation may be repeated and each bucket may be divided into more buckets of final resolution until the buckets contain one object only (or small enough number of data objects in order to use another sort algorithm). In step 511 using a histogram key related to grayscale or color coordinates instances of the same or similar color and/or grayscale are summed into buckets using the array of addressable registers 301. In the second example of the Hough transform, weights of the picture elements and/or the edge features are summed (step 511) to respective buckets using a histogram key so as to provide candidate lines or contours in local regions of the image space.

As an example, a histogram is desired for 12 bit data, that is stored in I=12 bits and array 301 of addressable registers includes only $2^7$ or 128 read-modify-write registers. In order to achieve a histogram of full resolution over I=12 bit data using the hardware available, bucket sort (step 509) is first performed over J=5 bits, into $2^5$ sorting buckets, for instance, based on the grayscale values of the 5 most significant bits of the 12 bit data. In step 511, each of $2^5$ sorting buckets is input via input registers 307, over a 7 bit bus, into processor 30 and instances of identical grayscale are summed in the 128 read-modify-write addressable registers of LUT array 301.

Referring back to FIG. 4 and returning to the second example of the Hough transform, feature extraction (step 451) may be performed by Sobel derivatives dx, dy for each point (x, y) in image frame 15. From the derivatives and the locations of picture elements in image frame 15, examples of parameters which may be extracted are:

An intensity/weight of the edge on a point, for example: abs(dx)+abs(dy), $dx^2+dy^2$, sqrt $(dx^2+dy^2)$ or $log(dx^2+dy^2)$.

Slope dy/dx or angle $tan^{-1}$ (dy/dx).

A distance from an origin (x0, y0) of a point of a line that lies on an edge, the distance measured in the direction (or maximum gradient) of the edge. There are many ways to define a distance. For example, (y−y0)*(dx/dy)−x0 is the horizontal distance from origin (x0, y0) from a point (x,y) in a line with slope dy/dx intersecting with the line defined by y=y0. The Euclidean distance from the origin (x0, y0) from the line may be calculated or another way of expressing distance may be used.

Edge features 453 from multiple picture elements are sorted into bins or buckets (step 509) according to a key, e.g. distance from origin, and/or gradient angle. Weights of the picture elements and/or the edge features are summed (step 511) to respective buckets using a histogram key so as to provide candidate lines or contours in local regions of the image space. Some parameters, e.g. distance to origin, angle may be used as coordinates in Hough Transform space and the histogram key may be used to sum weights over the Hough transform coordinates. For example (distance, angle) may be used as Hough transform coordinates and sqrt($dx^2+dy^2$) as Hough transform intensity may be used for summing data (step 511) into the histogram of the Hough transform.

Figure 5:
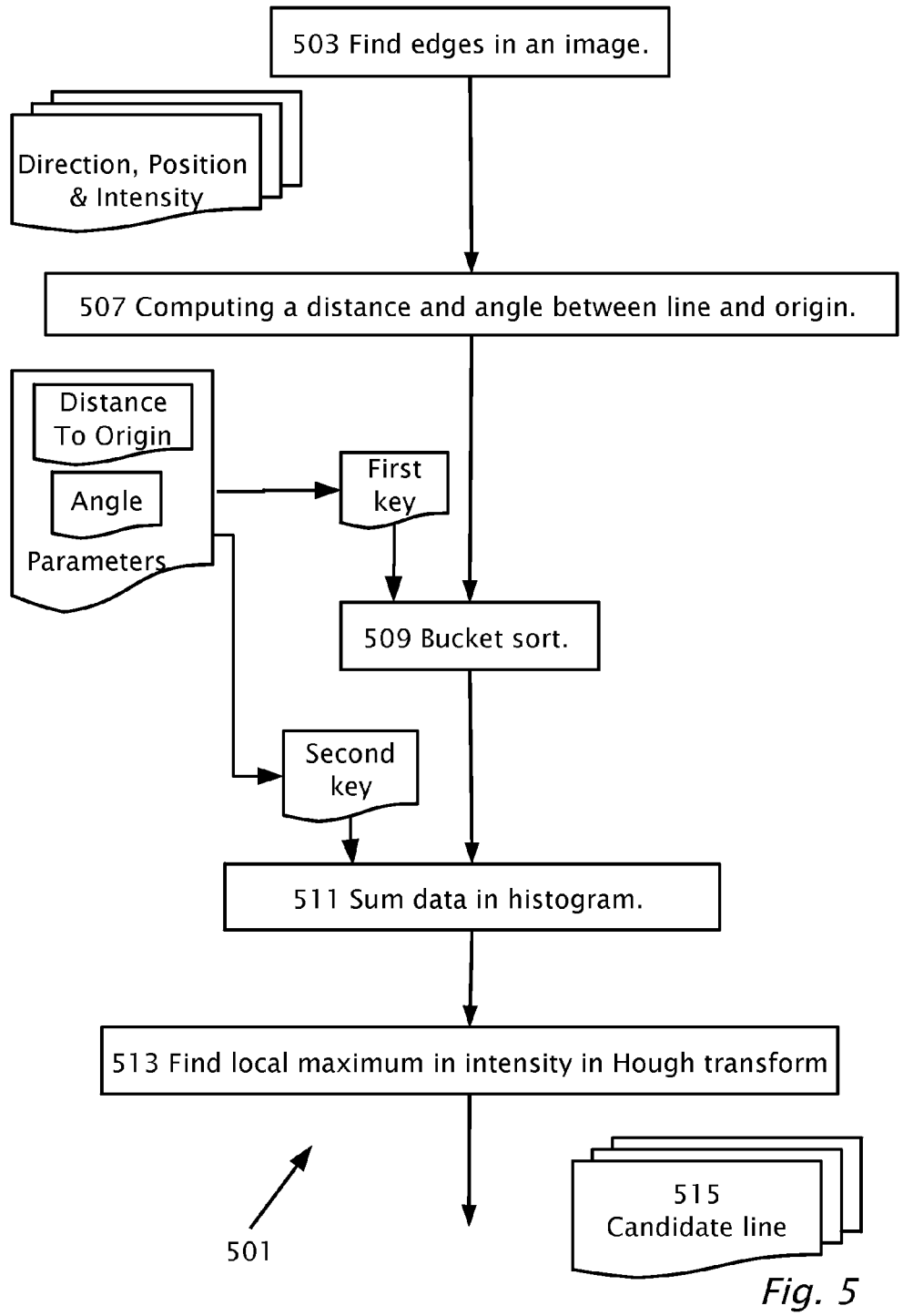
FIG. 5 illustrates method of FIG. 4 in greater detail, according to an aspect of the present invention.

Reference is now made to FIG. 5 which illustrates a method 501 in greater detail than shown in method 401 (FIG. 4) for the Hough transform example, according to features of the present invention. Reference is also made to FIG. 6 which shows parametrization of a line B3 in source image 15, according to a feature of the present invention. In method 501, edges are found (step 503) as shown at point B1 of source image 15 of FIG. 6, by using a Sobel operator technique or an another edge finding technique known in the art of image processing. At image point B1, line B3 is constructed shown at an angle $\theta_0$ from the vertical. Line B3 is parametrized by angle θ and/or distance d or by a function of angle θ and/or distance d. The distance $d_0$ is the distance from line B3 to a second line shown as a dotted line intersecting an origin O and parallel to B3. The term "distance to origin" as used herein with reference to a point in the source image is a function of position and angle within the source image and is defined as the distance between a first line intersecting the point and a second line intersecting an origin, wherein the first and second lines are parallel.

The direction and magnitude of gradient vector G may be calculated which points for instance to the normal of a detected edge feature or the direction of largest intensity increase, and the length of the gradient vector corresponds to the rate of intensity, (e.g gray scale, color) change in that direction.

where $$\theta = tan^{-1}\left(\frac{G_Y}{G_X}\right)$$

The above equations imply that the result of the Sobel operator at a point in source image 15 which is in a region of constant image intensity, is a null vector (of zero magnitude). Otherwise, if point B1 is on an edge a gradient vector G points transversely to the edge from darker to brighter values.

Referring now again to FIG. 5, distance $d_0$ from origin O on horizon H to point $B_1$ of gradient vector G, may be computed (step 507) and angle ($\theta_0$) calculated from horizontal and vertical derivative approximations $G_x$ and $G_y$ respectively.

Still referring to FIG. 5, edge features 453 which are parametrized by position, angle, distance to origin, are sorted (step 509) into buckets using one or more of parameters as a key: position, e.g. angle, distance to origin. Features 453 may be binned for example based on assigning all of the pixels with the direction angle between θ and θ+Δθ into the same bucket so that every bucket includes features with different distances d and with an angle between θ and θ+Δθ. Or, for example features 453 may be binned by assigning all of the pixels with the distance to origin between d and d+Δd into the same bucket so that every bucket includes features with different angles θ and with distances to origin between d and d+Δd.

Summing data (step 511) for the features stored individually within each bucket may be performed, Hough transform intensities are determined by summing (step 511) the data, e.g. weights of similar features, i.e. with same angle and distance to origin for each bucket after which in step 513, local maxima in intensity are determined in each bucket. The Hough transform intensity of a spot represents for example, the significance of a corresponding line in source image 15.

Reference is now made again to FIG. 6 and also to FIG. 6a which shows an example of local Hough transform image, according to a feature of the present invention. The Hough transform image has vertical axis of distance (d) versus horizontal axis of angle (θ). Line B3 in image 15, FIG. 6, is represented by a point in the Hough transform image of FIG. 6a.

Reference is now made to FIGS. 6b and 6c which show examples of multiple buckets 66 superimposed onto the local Hough transform image shown in FIG. 6a, according to a feature of the present invention. Multiple buckets (0 ... n) 66 are parametrized and/or selected each of which may be used to sum weights of similar angles to $\theta_0$ and distances to $d_0$ corresponding to a local Hough transform performed individually within each of buckets 66.

Figure 7:
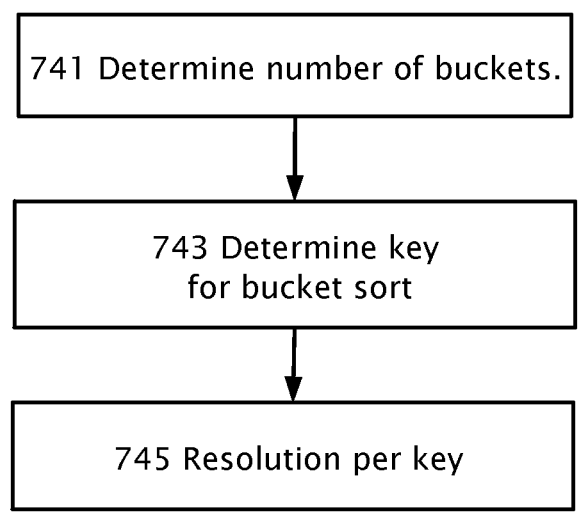
FIG. 7 shows more details of the bucket sort, according to a feature of the present invention.

Reference is now made to FIG. 7 which shows more details of bucket sort 509, according to features of the present invention. The number of buckets in which to sort features 453 may first be determined in step 741. According to a feature of the present invention, processor 30 includes a multiple addressable registers 301 each of which may be used to sum instances of similar grey scale/color coordinates in the first example and of similar angle and distance within the local Hough transform in the second example. Hence, the number of buckets may be chosen to be equal to or less than the number of available addressable registers 301. The key or keys used for sorting (step 509) are determined in step 743. In the first example, the sorting key may be include the most significant bits of the gray scale. In the second example, the sorting key may be distance to origin (d) or angle (θ) for example or functions of distance and/or angle. Resolution per key is selected in step 745. Resolution per key may be determined by performing a histogram over radix and finding the most appropriate radix over which to perform bucket sort 509. According to a feature of the present invention the histogram over radix to find the most appropriate radix for performing the sort may be performed using hardware 30 shown in FIG. 3 and specifically LUT addressable registers 301.

Addressable registers 301 may be used to perform bucket sort (step 509) on a small number of bins corresponding to the number of addressable registers 301 e.g. 256 relative to the amount of source image information. Method 501 may be performed by dividing the information into more than 256 portions, for instance, and then addressable registers 301 are used multiple times on different portions of the image data. Subsequent to bucket sort (step 509), the results may be mapped from addressable registers 301 into the original image coordinates.

Referring again to the second example, given coordinate distance d, angle θ when the distance value d is integer between 0 to 128 and the angle θ is an integer between 0 to 64. The image data may be divided according to the angle, into e.g. 64 portions and addressable registers 301 may be used to calculate a histogram on in each portion separately according to distance d. Buckets may be mapped according to the portions parametrized by angle θ and the bucket number parametrized by distance d.

In a more complex example, assume that the coordinates above may receive more values, for example, distance may receive an integer value between 0 to 256 and angle may receive an integer value between 0 to 256. The formula (d*2+θ/128) may be used as a key to divide the coordinates into portions and then addressable registers 301 are used on each portion using using angle θ modulo 128 as coordinate. Afterwards, each bucket may be mapped to (portion number/2, (portion number modulo 2)*128+bucket number) as (distance, angle) coordinate.

An example with recursive division assumes that the coordinates above may receive more values, for example distance d value is an integer between 0 to 256 and angle θ is an integer between 0 to 256. Distance divided by four, d/4, may be used as a key and the data is divided into the 64 bins and then each bin is divided into portions using ((distance%4)*2+angle/128) as a key. Then addressable registers 301 are used on each portion using angle modulo 128 as a coordinate. ('%' means modulo '*' means multiplied by and '/' means divided by)

The indefinite articles "a" and "an" is used herein, such as "a line", "an image" have the meaning of "one or more" that is "one or more lines" or "one or more images".

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

We claim:

1. A method for parallel processing of an image using processing circuitry including an array of addressable registers, the method comprising:
   extracting a plurality of image features from the image, wherein the image features are storable as data;
   according to respective values of a sorting key, wherein said sorting key is derived from at least one parameter of the data, sorting the image features into a plurality of N buckets; and
   using an array of M addressable registers, where M is less than N, according to values of a histogram key derived from said at least one parameter of the data, summing said data within said buckets thereby performing a histogram of the image features.

2. The method of claim 1, wherein the respective data of the image features are storable in binary storage in data words of I bits, the method, further comprising:
   said sorting the image features into $N=2^J$ buckets, wherein J is an integer greater than one and less than I; and
   using the array of at least $M=2^K$ addressable registers, wherein K is an integer greater or equal to the difference I−J between integer I and integer J, said summing said data within said buckets thereby said performing said histogram of the image features.

3. The method of claim 1, wherein the addressable registers are configured to manipulate data stored in a read-modify-write sequence.

4. The method of claim 1, wherein said sorting includes a sorting by radix, further comprising:
   determining the radix over which to sort by performing a histogram of the data over the radix, thereby preliminarily determining a resolution of said sorting key.

5. The method of claim 1, wherein said data of said image features are selected from the group consisting of: a color coordinate, at least one of a direction and magnitude of a gradient of a color coordinate, a grayscale value, at least one of a direction and magnitude of a gradient of a grayscale value.

6. The method of claim 1, wherein said data of said image features include data of edge features from a plurality of picture elements of the image selected from the group consisting of: a horizontal position coordinate with respect to an origin in the image, a vertical position coordinate with respect to said origin, intensity, horizontal intensity gradient and vertical intensity gradient.

7. The method of claim 6, further comprising:
   computing for at least one of said picture elements a distance between said at least one picture element and said origin based on said edge features; and
   computing for said picture elements a direction angle relative to a coordinate axis in said image;
   wherein said at least one parameter of the data is selected from the group consisting of: said distance, said direction angle, a function of said distance and a function of said direction angle.

8. The method of claim 7, wherein said sorting key includes said direction angle used for said sorting into said buckets and said histogram key includes said distance used for said summing said data associated with like distances within said buckets.

9. The method of claim 7, wherein said sorting key includes said distance used for said sorting by distance into said buckets and said histogram key includes said direction angle used for said summing said data associated with like direction angles within said buckets.

10. The processing circuitry including the array of addressable registers configured to perform the method of claim 1, the method comprising:
- extracting a plurality of image features from the image, wherein the image features are storable as data;
- according to respective values of a sorting key, wherein said sorting key is derived from at least one parameter of the data, sorting the image features into a plurality of N buckets; and
- using an array of M addressable registers, where M is less than N, according to values of a histogram key derived from said at least one parameter of the data, summing said data within said buckets thereby performing a histogram of the image features.

* * * * *